Figure 3:
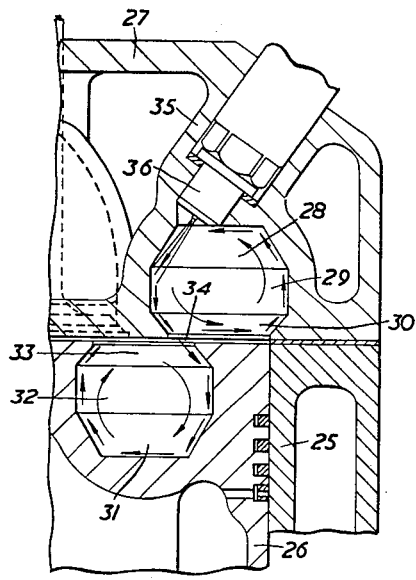

June 4, 1963
G. A. HOLT ETAL
3,092,087
INTERNAL COMBUSTION ENGINES
Filed Dec. 15, 1960
2 Sheets-Sheet 1
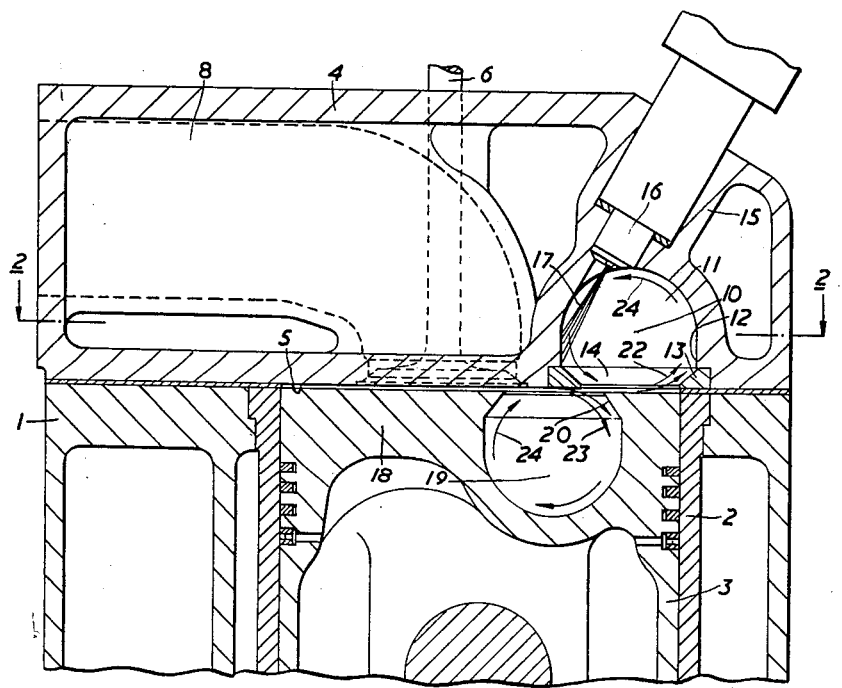
FIG. /.
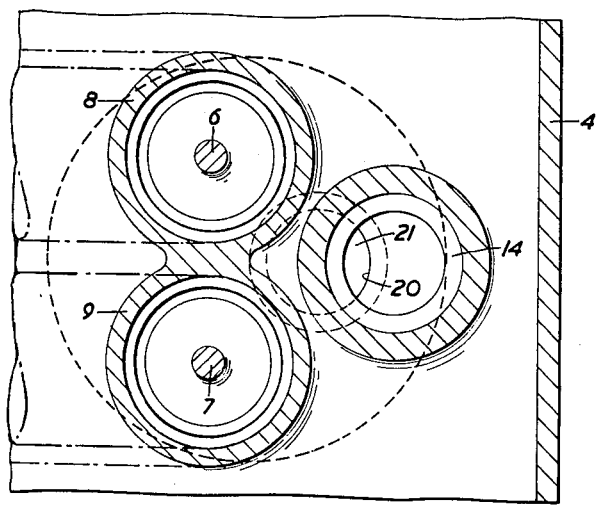
FIG. 2.
INVENTORS
GEORGE A. HOLT
JOHN C. HATTON
BY
Watson, Cole, Grindle & Watson
ATTORNEY June 4, 1963 G. A. HOLT ETAL 3,092,087
INTERNAL COMBUSTION ENGINES
Filed Dec. 15, 1960 2 Sheets-Sheet 2

INVENTORS
GEORGE A. HOLT
JOHN C. HATTON
BY
Watson, Cole, Grindle & Watson
ATTORNEY

United States Patent Office 3,092,087
Patented June 4, 1963

3,092,087
INTERNAL COMBUSTION ENGINES
George Allen Holt and John Christopher Hatton, Shoreham-by-Sea, England, assignors to Ricardo & Co., Engineers (1927) Limited, London, England, a company of Great Britain
Filed Dec. 15, 1960, Ser. No. 91,291
Claims priority, application Great Britain Dec. 31, 1959
12 Claims. (Cl. 123—32)

This invention relates to internal combustion engines of the liquid fuel injection compression ignition type, and more particularly to combustion chambers therefor.

In a largely used form of engine of the above type, known generally as a compression-swirl engine, a substantial proportion of the air charge is caused during the compression stroke to enter a combustion pocket of generally spheroidal form in such a manner as to cause bodily rotation of the air charge within the combustion pocket, the fuel being injected into the rotating air charge. In such engines the rotational movement of the air has hitherto generally been obtained by providing a restricted passage or throat between the cylinder bore and the combustion pocket disposed generally tangentially with respect to the periphery of the combustion pocket so that during the compression stroke the air charge is forced through this throat at high velocity to produce the required bodily rotational air movement within the combustion pocket.

While with this form of compression-swirl engine the indicated thermal efficiency is good, the brake thermal efficiency is adversely affected by the high pumping losses and heat losses which occur during the compression stroke and which persist during the expansion stroke due to the length of and the restriction of flow afforded by the throat.

It is an object of the present invention to provide an internal combustion engine of the compression ignition type which will have to a substantial extent the advantages of a compression-swirl engine without incurring the undesirably high pumping and heat losses inseparable from engines of this type constructed as above described.

According to the present invention an internal combustion engine of the liquid fuel injection compression ignition type comprises a cylinder and cylinder head assembly and a piston arranged to reciprocate within the cylinder and to approach the cylinder head closely at the end of the compression stroke, wherein the clearance volume between the piston and cylinder head at the end of the compression stroke is constituted mainly or substantially wholly by two combustion pockets formed respectively in the cylinder head and piston crown and each communicating substantially freely with the cylinder bore through a mouth, the mouths being displaced laterally from the cylinder axis and the form and position of the pockets being such in relation to their mouths and to the cylinder axis, and their mouths being so disposed in relation to one another, that the air entering each pocket during the compression stroke will approach the mouth of the pocket mainly from one side in such manner that the charge in each pocket at the end of the compression stroke will be in a state of bodily rotation, and the mouths of the pockets will overlap one another at the end of the compression stroke to provide a restricted overlapping area constituting a throat through which the two pockets communicate with one another across the narrow space between the piston crown and the cylinder head, and means are provided for injecting fuel into the pocket in the cylinder head.

The arrangement is preferably such that the overlapping area constituting the throat is so disposed in relation to the two pockets that during outflow from the pocket in the head into the pocket in the piston crown the circumferential portions of the rotating charge in the pocket in the head flow approximately tangentially from such pocket through the throat without appreciable change of direction and enter the pocket in the piston crown approximately tangentially and in the same general direction as that in which the part of the charge which it first meets in that pocket is moving.

Thus in an engine according to the invention the primary source of the rotational air movement in the pockets is the displacement of the air charge during the compression stroke from the cylinder bore into the two pockets, due to the fact that as the piston moves towards the cylinder head the displaced air is constrained to move more and more rapidly across the approaching faces of the cylinder head and piston towards the pockets into which it is almost wholly transferred when the piston reaches the top centre position, so that the air charge enters the pockets comparatively freely through their mouths in a substantially tangential direction to cause the bodily rotation of the air charge in the pockets.

Figure 5:
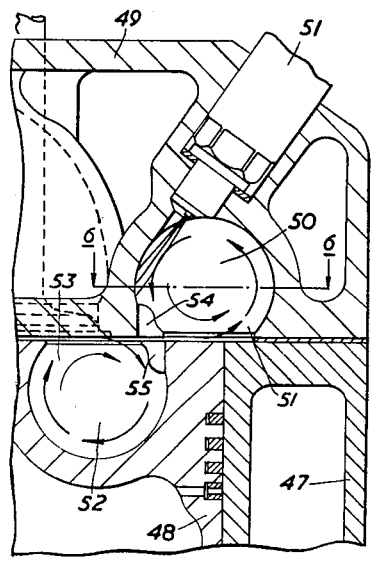
Figure 4:
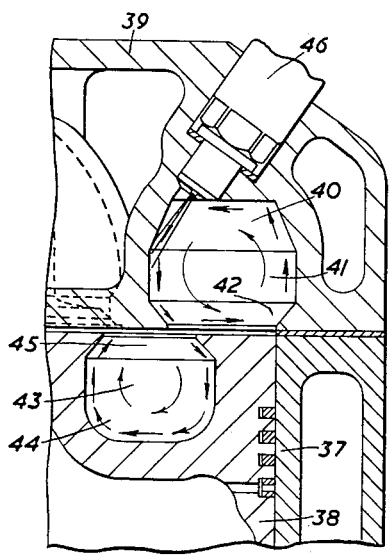
Figure 6:
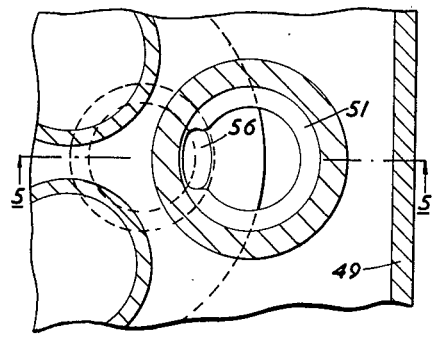

Viewed along the axis of the cylinder the center of volume of the pocket in the cylinder head ies preferably situated further from the cylinder axis than is that of the pocket in the piston crown, the centres of volume of the two pockets lying approximately on a radial line from the cylinder axis and the overlapping area being situated around the approximately radial line joining such centres of volume, and various constructions according to the invention embodying this feature are shown in the accompanying drawings, in which:

FIGURE 1 is a sectional side elevation of the upper part of the cylinder and of the cylinder head of one form of engine according to the invention, the cross-section being taken in a plane containing the cylinder axis and the centres of volume of the two combustion pockets, FIGURE 2 is a cross-section on the line 2—2 of FIGURE 1, FIGURE 3 is a partial cross-section showing a modification according to the invention of the arrangement shown in FIGURE 1, FIGURE 4 is a similar view to FIGURE 3 showing a further modification according to the invention, FIGURE 5 is a similar view to FIGURE 3 of a still further modification according to the invention, and FIGURE 6 is a cross-section on the line 6—6 of FIGURE 5.

In the construction shown in FIGURE 1 the engine comprises a cylinder block 1 with in which is mounted a liner 2 constituting the cylinder proper within which reciprocates a piston 3. The upper end of the cylinder is closed in conventional manner by a cylinder head 4 having a lower face 5 in which are formed inlet and exhaust ports which are controlled by poppet valves indicated at 6 and 7 and communicate with inlet and exhaust passages indicated at 8 and 9, all in substantially conventional manner.

Formed in the cylinder head 4 is a combustion pocket 10 having an approximaely hemispherical upper surface 11 and a cylindrical mouth portion 12 in which is disposed a ring 13 having a frusto-conical inner surface 14 constituting the mouth proper of the pocket 10. As will be seen, the entre of volume of the pocket 10 is displaced radially a substantial distance from the axis of the cylinder 2.

Also formed in the cylinder head 4 is a tubular socket 15 for a fuel injection nozzle 16, which may conveniently be of the pintle type, and is arranged, as shown, to deliver an approximately conical jet of fuel 17 towards a part of the inner surface of the pocket 12 on the side adjacent to the axis of the cylinder 2.

Formed in the crown 18 of the piston 3 is a second combustion pocket 19 of the same general form as the pocket 10 but with a frusto-conical mouth portion 20 formed by an integral part of the piston crown instead of by a separate ring. The centre of the pocket 19 is displaced substantially from the axis of the cylinder 2 and lies in the same radial plane containing this axis as does the centre of the pocket 10, and it will be seen that at the top dead centre position of the piston shown in FIGURE 1 the piston face closely approaches the face 5 of the cylinder head and the mouths of the pockets 10 and 19 overlap at 21 to provide a restricted overlapping area constituting a throat through which the two pockets communicate with one another across the narrow space between the piston crown and the cylinder head.

It will be apparent that, during the compression stroke the air displaced by the piston from the cylinder bore will flow towards and into the two combustion pockets 10 and 19 mainly in a direction across the faces of the piston and cylinder head and generally parallel to the common plane in which the axis of the cylinder and the centres of volume of the two pockets lie so that this air will enter the two pockets generally in the direction of the arrows 22 and 23 and thus tend to rotate bodily within the pockets in the manner indicated by the arrows 24.

It will further be seen that when the fuel 17 is injected into the rotating air charge in the pocket 10 and the burning and expansion of the gases thus begins, the circumferential portions of the rotating charge in the pocket 10 will tend to flow without substantial change of direction through the throat 21 into the pocket 19, thus tending to increase the rotation of the charge in the pocket 19, and that this effect will continue over the early part of the expansion stroke of the piston 3. Moreover the charge flowing from the pocket 10 into the pocket 19 under these conditions will contain a substantial proportion of unburnt, as well as of burning, fuel and the increase in the speed of rotation of the charge in the pocket 19 will tend to cause satisfactory burning of this fuel with the air already in the pocket and any air which may enter this pocket with the fuel from the pocket 10.

It will also be seen that as the piston 18 recedes from the cylinder head 4 communication between the mouths 14 and 20 of the pockets 10 and 19 and the cylinder bore will become less and less restricted so that the pockets come into substantially open communication with the cylinder bore after a comparatively small initial movement of the piston 3 on its expansion stroke, whereby pumping and heat losses tend to be reduced.

FIGURE 3 shows in a cross-section similar to that of FIGURE 1 an alternative form which the combustion pockets may take in an engine having an unlined cylinder 25 in which operates a piston 26 while the upper end of the cylinder is closed by a cylinder head 27 which, apart from the arrangement of the pockets shown in FIGURE 3, may be regarded as similar to the cylinder head 4 in FIGURE 1.

In the modification shown in FIGURE 3 the cylinder head 27 is formed with a combustion pocket of generally spheroidal form comprising a frusto-conical upper portion 28, a cylindrical intermediate portion 29, and a frusto-conical mouth portion 30, while there is formed in the crown of the piston 26 a similar combustion pocket comprising a frusto-conical portion 31, a cylindrical portion 32, and a frusto-conical mouth portion 33, the mouths of the two pockets overlapping at the end of the compression stroke as shown to provide a restricted throat 34 by which the two pockets communicate across the narrow space between the piston 26 and cylinder head 27. The cylinder head is also provided with a tubular socket 35 for a fuel injection nozzle 36 by which fuel can be injected into the pockets 28, 29, 30 in the direction indicated. The general movement of the gases in the combustion pockets is indicated by arrows and the general operation of the engine would be similar to that described with reference to FIGURES 1 and 2.

FIGURE 4 shows a further modification in which the engine may be considered as otherwise similar to that described with reference to FIGURE 3. In the modification shown in FIGURE 4 the engine comprises a cylinder 37 containing a piston 38 and closed at its upper end by a cylinder head 39 in which is formed a combustion pocket comprising a frusto-conical upper portion 40, a cylindrical intermediate portion 41, and a frusto-conical mouth portion 42, the form of the pocket being modified slightly as compared with that shown in FIGURE 3 so as to provide a pocket of slightly greater volume. In this construction the piston 38 has formed in its crown a combustion pocket comprising a substantially cylindrical portion 43 with a dished lower end 44, and a frusto-conical mouth portion 45, the volume of the pocket in the piston 38 being substantially less than that of the pocket in the cylinder head. The fuel injection device 46 in the cylinder head is arranged to direct the fuel in the same general manner as the injection devices 16 and 36 in FIGURES 1 and 3, the general direction of movement of the charges in the two combustion pockets is shown by arrows, and the general operation of the engine will be similar to that described with reference to FIGURE 1.

In the further modification shown in FIGURES 5 and 6 the engine comprises a cylinder 47 in which reciprocates a piston 48, the upper end of the cylinder being closed by a cylinder head 49, which may be regarded as of the same general form as that described with reference to FIGURE 1 except for the form and arrangement of the pocket therein. In the construction shown in FIGURES 5 and 6 the cylinder head is formed to provide a combustion pocket which has a hemispherical upper portion 50 and a part-spherical lower portion 51, while a similar pocket is formed in the crown of the piston 48 comprising a hemispherical lower portion 52 and a part-spherical upper portion 53. The mouth of the pocket 50, 51 overlaps the cylinder bore, and slots 54 and 55 extending approximately parallel to the cylinder axis are formed respectively in the portion 51 of the cylinder head pocket and the portion 53 of the piston pocket as shown so as to provide local enlargements of the mouths of the two pockets to produce the required overlapping parts, and these overlapping slots constitute the throat as indicated at 56.

The fuel injection device 57 is arranged to direct fuel in the same general direction as in the constructions shown in the other figures.

In FIGURE 5 arrows indicate the general directions of movement of the charge in the two combustion pockets and the operation of the engine will be generally similar to that described with reference to the other figures.

It will be appreciated that with the constructions according to the invention shown in the drawings the speed of the rotational air movement produced in the cylinder head pocket will tend to be greater than that produced in the pocket in the piston crown since the latter lies nearer to the cylinder axis. Further the rotational speed in each pocket at the end of the compression stroke will tend to be less than that obtained in a similar combustion pocket having a restricted tangential throat as in the prior form of compression-swirl engine referred to above. The flow of gases out of the pocket in the cylinder head through the throat and into the pocket in the piston crown during the combustion period in engines according to the invention will, however, tend to accelerate the rotational movement of the air charge in the combustion pocket in the piston crown so that an adequate rate of air movement in the latter pocket to ensure efficient combustion of the whole of the fuel injected tends to be obtained and maintained.

It will further be seen that the maximum restriction produced by the throat where the pockets overlap is operative only at the top dead centre position of the piston and that this restriction is rapidly reduced as the piston moves away from the cylinder head so that it tends to become negligible at or before the point in the cycle at which the combustion process is completed. Thus during the greater part of the compression stroke and during the greater part of the expansion stroke, therefore, the combustion pockets communicate substantially freely with the cylinder bore, thus tending to eliminate the high heat losses and pumping losses experienced with known engines of the compression-swirl type referred to above.

It is believed that this fact accounts for the smooth running, moderate rate of combustion pressure rise and good thermal efficiency and maximum power output of engines according to the invention.

What we claim as our invention and desire to secure by Letters Patent is:

1. An internal combustion engine of the liquid fuel injection, compression ignition type comprising a cylinder and cylinder head assembly, a piston arranged to reciprocate within the cylinder and to approach the cylinder head closely at the end of the compression stroke, a combustion pocket formed in each of said cylinder head and piston crown, one of said pockets being inverted relative to the other and both pockets being in direct communication with the cylinder space through their respective open mouths, said mouths having a cross-sectional area permitting at least substantially unrestricted flow of gases therethrough and being located at loci substantially displaced laterally from the axis of said cylinder, whereby during said compression stroke air is introduced into said pockets mainly from one side thereof to form an air charge therein, both of said pockets being so shaped as to impart in conjunction with the location thereof a natural state of rotation to the air introduced therein, the centers of volume of said pockets lying in substantially the same plane as the cylinder axis and the locus of one pocket mouth being nearer the cylinder axis than the locus of the other mouth, whereby said mouths overlap to a limited extent to provide a restricted throat of substantially less cross-sectional area than that of either of said pocket mouths through which said pockets are in communication while said cylinder head and piston crown are in proximity, and means for injecting fuel into the pocket in the cylinder head.

2. An internal combustion engine as claimed in claim 1, in which the fuel injection means are arranged to direct fuel towards a part of the surface of the pocket in the cylinder head over which the rotating charge in that pocket sweeps somewhat prior to reaching the overlapping area constituting the throat.

3. An internal combustion engine of the liquid fuel injection compression ignition type as claimed in claim 2, in which the fuel injection device is situated so that the fuel is injected into the rotating charge in a direction having a substantial component of movement in the same direction as that of the movement of the part of the charge which it enters.

4. An internal combustion engine as claimed in claim 2 in which the centres of volume of the two pockets lie substantially in a common plane containing the cylinder axis, with the centre of volume of the pocket in the piston head displaced by a greater degree from said axis than is the centre of volume of the pocket in the piston crown.

5. An internal combustion engine of the liquid fuel injection compression ignition type as claimed in claim 1 in which the mouth portion of at least one of the combustion pockets is of generally tapered form with its larger cross-sectional area adjacent to the centre of volume of the pocket.

6. An internal combustion engine of the liquid fuel injection compression ignition type as claimed in claim 5 in which the centres of volume of the two pockets lie substantially in a common plane containing the cylinder axis, with the centre of volume of the pocket in the piston head displaced by a greater degree from said axis than is the centre of volume of the pocket in the piston crown.

7. An internal combustion engine of the liquid fuel injection compression ignition type as claimed in claim 1 in which the mouth portion of at least one of the pockets is formed with a slot extending in a direction having a substantial component parallel to the axis of the cylinder and providing at least part of the overlapping area of the pocket constituting the throat.

8. An internal combustion engine of the liquid fuel injection compression ignition type as claimed in claim 7 in which the outer end portion of at least one of the pockets is of approximately hemispherical form.

9. An internal combustion engine of the liquid fuel injection compression ignition type as claimed in claim 1, wherein at least one of said pockets comprises a generally cylindrical center portion and a generally frusto-conical portion at each termination of said center portion, the smaller ends of said frusto-conical portions being remote from one another, one of said smaller ends constituting the open mouth of the pocket.

10. The engine of claim 1 wherein the cross-sectional area of each pocket mouth is substantially equal to the maximum cross-sectional area of the corresponding pocket transversely of the cylinder axis.

11. An engine as in claim 1 wherein the mouth of the pocket in the piston crown is nearer the cylinder axis than is the mouth of the pocket in the cylinder head.

12. An engine as in claim 1 wherein each of said pockets is of substantially symmetrical configuration taken along the plane containing the cylinder axis and the centers of volume of said pockets.

References Cited in the file of this patent

FOREIGN PATENTS

| | | |
|---|---|---|
| 499,778 | Great Britain | Jan. 30, 1939 |
| 717,215 | Great Britain | Oct. 20, 1954 |
| 854,804 | Great Britain | Nov. 23, 1960 |
| 767,133 | Germany | Nov. 8, 1951 |
| 321,654 | Switzerland | June 29, 1957 |
| 201,348 | Austria | Dec. 27, 1958 |